US008799275B2

United States Patent
Peng et al.

(10) Patent No.: US 8,799,275 B2
(45) Date of Patent: Aug. 5, 2014

(54) INFORMATION RETRIEVAL BASED ON SEMANTIC PATTERNS OF QUERIES

(75) Inventors: Sheng Peng, Beijing (CN); Jian Sun, Beijing (CN); Lei Hou, Beijing (CN); Qin Zhang, Hangzhou (CN)

(73) Assignee: Alibaba Group Holding Limited (KY)

( * ) Notice: Subject to any disclaimer, the term of this patent is extended or adjusted under 35 U.S.C. 154(b) by 248 days.

(21) Appl. No.: 12/807,217

(22) Filed: Aug. 30, 2010

(65) Prior Publication Data

US 2011/0060733 A1 Mar. 10, 2011

(30) Foreign Application Priority Data

Sep. 4, 2009 (CN) .......................... 2009 1 0171083

(51) Int. Cl.
*G06F 17/30* (2006.01)
(52) U.S. Cl.
USPC ........... 707/723; 707/739; 707/751; 707/794; 707/771
(58) Field of Classification Search
CPC ...................................................... G06F 17/30
See application file for complete search history.

(56) References Cited

U.S. PATENT DOCUMENTS

| | | | | |
|---|---|---|---|---|
| 4,815,005 A | * | 3/1989 | Oyanagi et al. ................. 706/55 |
| 4,914,585 A | * | 4/1990 | Packard et al. ................ 716/106 |
| 4,965,763 A | * | 10/1990 | Zamora ............................. 704/1 |
| 5,029,223 A | * | 7/1991 | Fujisaki ........................ 382/187 |
| 5,130,924 A | * | 7/1992 | Barker et al. ................. 715/205 |
| 5,227,971 A | * | 7/1993 | Nakajima et al. ................ 704/2 |
| 5,299,125 A | * | 3/1994 | Baker et al. ....................... 704/9 |
| 5,309,546 A | * | 5/1994 | Baker et al. ................... 704/271 |
| 5,313,387 A | * | 5/1994 | McKeeman et al. ............ 700/90 |
| 5,317,671 A | * | 5/1994 | Baker et al. ................... 704/271 |
| 5,331,556 A | * | 7/1994 | Black et al. ....................... 704/9 |
| 5,457,768 A | * | 10/1995 | Tsuboi et al. ................. 704/231 |
| 5,499,371 A | * | 3/1996 | Henninger et al. ........... 717/108 |
| 5,504,914 A | * | 4/1996 | Lai ................................. 712/226 |
| 5,523,945 A | * | 6/1996 | Satoh et al. ....................... 704/9 |

(Continued)

FOREIGN PATENT DOCUMENTS

JP 2007133688 5/2007

OTHER PUBLICATIONS

Wu, Xiaohu;, Yan, Jun; Lui Ning; Yan, Shuicheng; Chen, Ying; Chen, Zheng, "Probabilistic Latent Semantic User Segmentation for Behavioral Targeted Advertising," ACM, ADKDD '09, Jun. 28, 2009, pp. 10-17. (8 total pages).*

(Continued)

*Primary Examiner* — Farhan Syed
(74) *Attorney, Agent, or Firm* — Van Pelt, Yi & James LLP

(57) ABSTRACT

An information retrieval method includes pre-processing a set of historical query information and processing a user query. Pre-processing a set of historical query information includes determining a plurality of semantic patterns based on a plurality of queries in the set of historical query information; establishing correspondence relationships between the plurality of semantic patterns and a plurality of filtering and ranking operations. Processing a user query comprises receiving the user query; retrieve a plurality of results in response to the user query; determining a semantic pattern that corresponds to the user query; determining a set of filtering and ranking operations that corresponds to the semantic pattern based on the correspondence relationships; and performing the set of filtering and ranking operations on the plurality of results to generate a set of filtered and ranked results.

18 Claims, 4 Drawing Sheets

(56) References Cited

U.S. PATENT DOCUMENTS

| | | | | |
|---|---|---|---|---|
| 5,555,417 | A | * | 9/1996 | Odnert et al. .................. 717/159 |
| 5,572,731 | A | * | 11/1996 | Morel et al. .................. 717/104 |
| 5,608,623 | A | * | 3/1997 | Sata et al. ........................ 704/4 |
| 5,615,336 | A | * | 3/1997 | Robson et al. ................. 719/316 |
| 5,625,767 | A | * | 4/1997 | Bartell et al. .................. 345/440 |
| 5,659,727 | A | * | 8/1997 | Velissaropoulos et al. ........... 1/1 |
| 5,664,173 | A | * | 9/1997 | Fast .............................. 707/694 |
| 5,676,138 | A | * | 10/1997 | Zawilinski .................... 600/301 |
| 5,684,999 | A | * | 11/1997 | Okamoto ........................... 704/9 |
| 5,687,254 | A | * | 11/1997 | Poon et al. .................... 382/229 |
| 5,692,184 | A | * | 11/1997 | Ardoin et al. ................. 700/182 |
| 5,721,938 | A | * | 2/1998 | Stuckey ........................... 704/4 |
| 5,909,678 | A | * | 6/1999 | Bergman et al. ..................... 1/1 |
| 6,006,223 | A | * | 12/1999 | Agrawal et al. ............... 704/251 |
| 6,185,560 | B1 | * | 2/2001 | Young et al. .................. 707/776 |
| 6,233,575 | B1 | * | 5/2001 | Agrawal et al. ...................... 1/1 |
| 6,308,172 | B1 | * | 10/2001 | Agrawal et al. ...................... 1/1 |
| 6,314,419 | B1 | * | 11/2001 | Faisal ........................... 707/739 |
| 6,523,028 | B1 | | 2/2003 | DiDomizio et al. |
| 6,697,793 | B2 | | 2/2004 | McGreevy |
| 6,766,320 | B1 | * | 7/2004 | Wang et al. ......................... 1/1 |
| 6,859,800 | B1 | | 2/2005 | Roche et al. |
| 7,120,861 | B1 | * | 10/2006 | Marukawa .................... 715/210 |
| 7,143,349 | B2 | * | 11/2006 | Marukawa .................... 715/255 |
| 7,428,517 | B2 | * | 9/2008 | Brands et al. ................... 706/45 |
| 7,630,986 | B1 | * | 12/2009 | Herz et al. .......................... 1/1 |
| 7,689,411 | B2 | * | 3/2010 | Sandor et al. ...................... 704/9 |
| 7,711,547 | B2 | | 5/2010 | Abir |
| 7,882,485 | B2 | * | 2/2011 | Feblowitz et al. ............ 717/104 |
| 7,941,745 | B2 | * | 5/2011 | Marukawa .................... 715/234 |
| 8,060,513 | B2 | * | 11/2011 | Basco et al. .................. 707/739 |
| 8,065,319 | B2 | * | 11/2011 | Ding et al. .................... 707/769 |
| 2002/0042793 | A1 | * | 4/2002 | Choi ................................. 707/6 |
| 2004/0010483 | A1 | * | 1/2004 | Brands et al. ................... 706/45 |
| 2005/0257140 | A1 | * | 11/2005 | Marukawa .................... 715/513 |
| 2006/0064411 | A1 | | 3/2006 | Gross et al. |
| 2006/0206464 | A1 | * | 9/2006 | Marukawa ....................... 707/3 |
| 2006/0235843 | A1 | * | 10/2006 | Musgrove et al. ................ 707/6 |
| 2007/0005343 | A1 | * | 1/2007 | Sandor et al. ...................... 704/9 |
| 2007/0239716 | A1 | | 10/2007 | Weininger et al. |
| 2008/0120129 | A1 | * | 5/2008 | Seubert et al. ..................... 705/1 |
| 2008/0214148 | A1 | * | 9/2008 | Ramer et al. ............... 455/414.1 |
| 2008/0215557 | A1 | * | 9/2008 | Ramer et al. ...................... 707/4 |
| 2008/0243450 | A1 | * | 10/2008 | Feblowitz et al. ............... 703/2 |
| 2008/0294637 | A1 | * | 11/2008 | Liu .................................. 707/6 |
| 2009/0006320 | A1 | * | 1/2009 | Ding et al. ........................ 707/2 |
| 2009/0037398 | A1 | | 2/2009 | Horvitz et al. |
| 2009/0083230 | A1 | | 3/2009 | Watanabe et al. |
| 2009/0100045 | A1 | | 4/2009 | Feng et al. |
| 2009/0157401 | A1 | | 6/2009 | Bennett |
| 2009/0216765 | A1 | | 8/2009 | Dexter et al. |
| 2009/0254971 | A1 | * | 10/2009 | Herz et al. ........................ 726/1 |
| 2010/0005061 | A1 | * | 1/2010 | Basco et al. ...................... 707/3 |
| 2010/0250577 | A1 | * | 9/2010 | Cao et al. ...................... 707/760 |
| 2010/0257193 | A1 | * | 10/2010 | Krupka et al. ................. 707/768 |
| 2010/0332493 | A1 | * | 12/2010 | Haas et al. .................... 707/759 |
| 2011/0153428 | A1 | * | 6/2011 | Ramer et al. ............... 705/14.64 |
| 2011/0283260 | A1 | * | 11/2011 | Bucuvalas ..................... 717/124 |
| 2012/0030206 | A1 | * | 2/2012 | Shi et al. ....................... 707/738 |
| 2013/0097664 | A1 | * | 4/2013 | Herz et al. ........................ 726/1 |

OTHER PUBLICATIONS

Parikh, Nish; Sundaresan, Neel, "Inferring Semantic Query Relations from Collective User Behavior," ACM, CIKM '08, Oct. 26-30, pp. 349-358. (10 total pages).*

* cited by examiner

INFORMATION RETRIEVAL BASED ON SEMANTIC PATTERNS OF QUERIES

CROSS REFERENCE TO OTHER APPLICATIONS

This application claims priority to People's Republic of China Patent Application No. 200910171083.X entitled INFORMATION RETRIEVAL METHOD AND SYSTEM THEREOF filed Sep. 4, 2009 which is incorporated herein by reference for all purposes.

BACKGROUND OF THE INVENTION

Search engines are indispensable tools for collecting and locating information. The typical search engines analyze users' input queries such as keywords or key phrases, locate, and return results. Search engines often use indexed information to locate relevant information that matches the users' needs. Many existing search engines are designed to classify a query by category and then locate relevant entries in the category. For example, the query for "Michael Jordan" may be classified in the category of sports and "Barack Obama" may be classified in the categories of news and/or politics.

Category-based query classification is useful for vertical search engines designed to search specific, already categorized information. It is, however, often unsuitable for identifying the user's intentions. For example, a typical category-based search engine can determine the query "Mobile Battery" is in the field of electronics; however, such a search engine often cannot easily figure out whether the user is looking for a mobile phone or for a battery, which results in poor relevance.

BRIEF DESCRIPTION OF THE DRAWINGS

Various embodiments of the invention are disclosed in the following detailed description and the accompanying drawings.

For a better understanding of the technical solutions in the embodiments of the invention or the prior art, accompanying figures of the embodiments or the prior art are briefly described hereinafter. It would be apparent to those skilled that the figures described below are merely some embodiments of the invention, and other figures may be obtained based on these figures without inventive efforts.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Information retrieval using the semantic pattern of the query to identify user intentions and filtering and ranking operations is disclosed. In some embodiments, a pre-processing stage is used to build correspondence relationships between semantic patterns of queries and filtering and ranking operations. New queries are processed to identify their semantic patterns, and query results are filtered and ranked using filtering and ranking operations that correspond to the semantic patterns. Since user intentions are reflected by the semantic patterns, the filtered and ranked results tend to be highly relevant.

Figure 1:
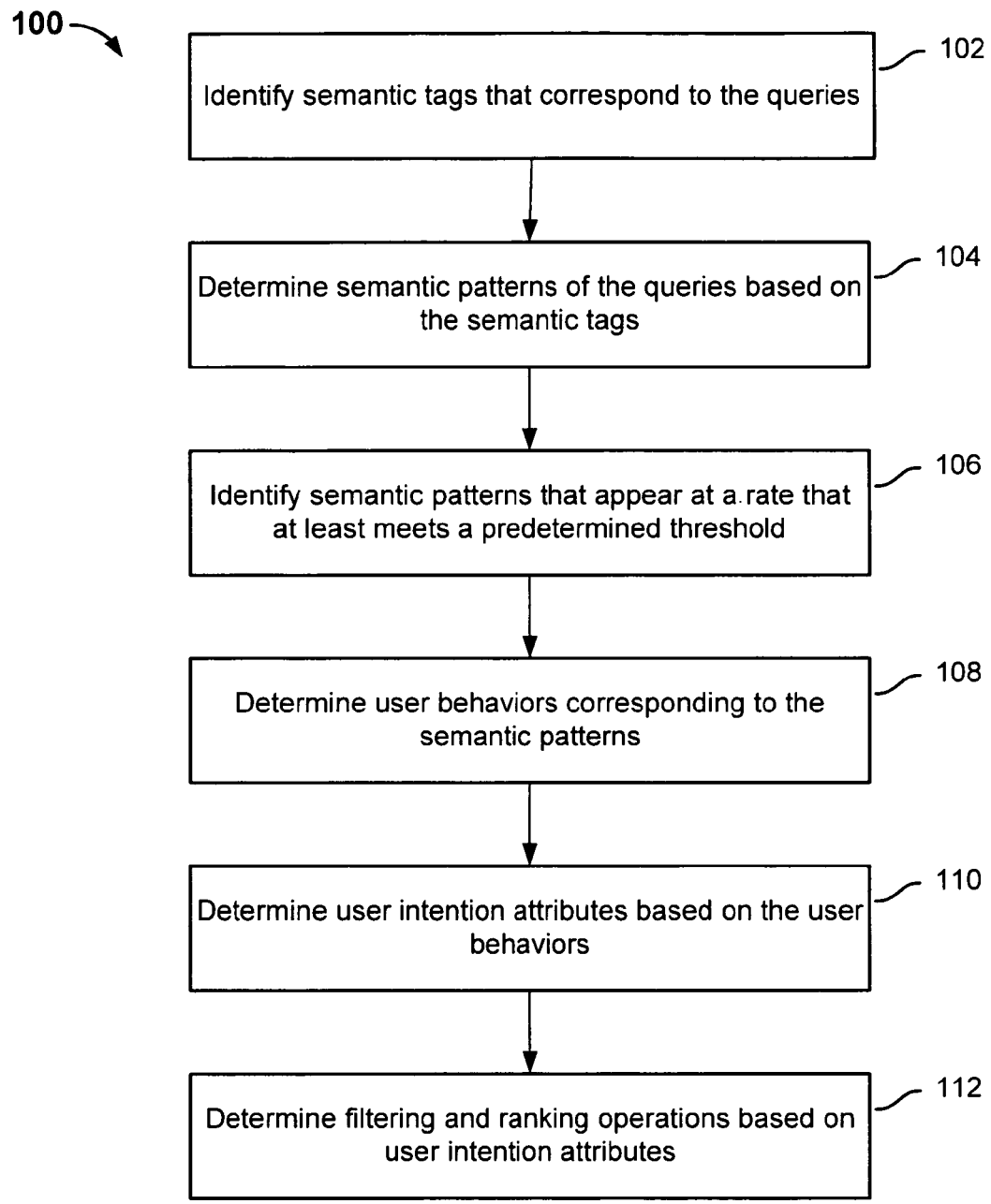
FIG. 1 is a flowchart illustrating an embodiment of a pre-processing stage.

FIG. 1 is a flowchart illustrating an embodiment of a pre-processing stage. Process 100 may be performed on a system such as system 300 described in connection with FIG. 3 below.

In FIG. 1, at 102, a semantic analysis is performed on a set of historical query records to identify semantic tags that correspond to the queries. As used herein, a semantic tag refers to a characterization of a query term. Manual specification (such as specification by webpage/website authors or reviewers) and/or machine processing techniques can be used to establish the association of query terms and their corresponding semantic tags. For example, the query term "Phone" is associated with a semantic tag of "Product," the term "Mobile" is associated with the semantic tag of "Modifier," and the term "Maintenance" is associated with a semantic tag of "Intention." In this example, a database of query terms and their corresponding semantic tags is made available before process 100 is initiated, and the semantic analysis is performed by looking up the query terms in the database.

At 104, the semantic patterns of the queries are determined by a statistical measurement based on the semantic tags. The semantic patterns are patterns based on characteristics of natural languages and may be constructed manually and/or by machine learning. For example, if the query includes a plurality of query words, a central term is to be determined based on characteristics of natural languages. In this example, a semantic pattern of a query is a summary of the semantic tags of the query terms. For example, the query "mobile battery" has a central term "battery" and a semantic pattern "Modifier+Product". Similarly, "digital camera" also has the semantic pattern "Modifier+Product". Other examples of semantic patterns include "Product+Intention" (e.g., "engine maintenance"), "Product+Price" (e.g., "banana price"), etc.

The semantic patterns corresponding to the queries are stored in a semantic pattern table. Longer period of time for collecting the historical data and more recorded queries result in wider coverage of the semantic patterns, and therefore higher accuracy in finding query results.

Although numerous semantic patterns may be formed for a set of historical query data, to ensure that the patterns are statistically significant, only selective ones are used. Thus, at 106, semantic patterns that appear at a rate that at least meets a predetermined threshold are identified and selected.

In some embodiments, each query entry in the collection of historical records are labeled in the following form:

[Query]\t[Semantic Pattern]\t[PV]; where Query is the query, Semantic Pattern is the semantic pattern, and PV is the number of times that the query was made in the historical record collection.

The entries are stored in the following table:

TABLE 1

| Query | Semantic Pattern | PV |
|---|---|---|
| digital camera | Modifier + Product | 13 |
| engine maintenance | Product + Intention | 4 |
| ... | ... | ... |
| mobile battery | Modifier + Product | 13 |

Based on the entries in the table, the number of times each semantic pattern appears in the search queries is determined by summing the PV values corresponding to the semantic pattern. For example, the "Modifier+Product" pattern appears 26 times in this record set. Thus, semantic patterns with total PV exceeding a predetermined threshold are identified.

In some embodiments, semantic patterns that appear at rates exceeding a predetermined threshold are marked. In some embodiments, such semantic patterns are stored separately.

At 108, user behaviors corresponding to the semantic patterns are determined based on historical records. As used herein, the user behavior refers to user action such as selecting specific links among results returned after a query is entered. Based on records of user queries and user actions in response to the queries, the correspondence between semantic patterns and user behaviors is established. For example, for a "Brand+Price" pattern, user behaviors may include selecting results that provide exact match, results from authoritative websites, and results that are based on locations.

A user behavior indicates the user's intention, which is characterized using user intention attributes in some embodiments. At 110, one or more user intention attributes of each semantic pattern is determined based on user behavior associated with the semantic pattern.

Examples of user intention attributes include degree of ambiguity, authority requirement, time efficiency requirement and location requirement, etc. The attributes used in some embodiments and the possible values corresponding to the attributes are shown in Table 2 below:

TABLE 2

| Intention attribute of semantic pattern | Attribute value |
|---|---|
| degree of ambiguity | definite/ambiguous/accurate |
| authority requirement | authoritative result required/ authoritative result not required |
| time efficiency requirement | Yes/No |
| location requirement | local/nearby/not required |

As used herein, the degree of ambiguity refers to the degree of certainty of the understanding by the user to the queried information. When the user has a specific understanding of queried information but the response does not have to be unique, the semantic pattern is considered as a definite semantic pattern. Examples of a definitive semantic pattern of a query include a particular brand name or product number (e.g. "Nokia N92 original battery"), or a word having a specific definition. When the user makes a query that requires a unique response, the semantic pattern of the query is considered to be an accurate semantic pattern. For example, queries for "Alibaba Customer Service Phone Number" or "Mao Zedong's Birthday." When the user's query is neither definitive nor accurate, multi-perspective, multi-source and multi-field results are to be provided by the search engine, and the semantic pattern is considered to be a generalized semantic pattern. For example, a query for "Shanghai supply cooperative" has a generalized semantic pattern.

It should be noted that, determination of the degree of ambiguity of the semantic pattern may be performed according to each query word of a certain query. For example, "Mobile Battery" has a generalized pattern and "Nokia N92 Battery" has a definite pattern because the scope of "Nokia N92" is much smaller than that of "Mobile".

The authority requirement refers to whether the user query requires a result from an authoritative source. The authority requirement may be determined from a literal meaning. For example, the semantic pattern "year+policy" is a pattern that requires an authoritative result; therefore, for a query with the "year+policy" semantic pattern (such as "2008 Tax Law"), results from authoritative sources such as the official government website are given priority.

The time efficiency requirement refers to the requirement that results are from a certain point in time or a certain period of time. It may be an implicit time requirement; for example, the query "Banana Price" requires information to be as close to real-time as possible. The time efficiency requirement may also be determined from a literal meaning. If a semantic pattern relates to a particular time word (e.g. year, month, date), the semantic pattern has a time efficiency requirement (e.g., "2008 Export Tax Return Limit"). Some words may directly indicate a time efficiency requirement, e.g. "New" and "Latest", therefore the query "Latest Nokia" is to be configured with a semantic pattern having a time efficiency requirement.

The location requirement refers to whether the search object has a location scope limitation. Based on prior knowledge about user search habits, certain types of queries are considered to be related to locations. For example, the query "Coal Transport" has a corresponding semantic pattern "Product+Transport" that implies information about products transported outbound or products transported inbound.

In some embodiments, a certain type of semantic patterns relating to products may have a volume attribute indicating whether a product is sold in small quantities or in bulk. For example, the query "Rice Sales" is normally considered a wholesale query and "Dell D630" is considered a retail sale query.

Accordingly, a semantic pattern such as "Transport Product" has attribute values "ambiguous", "authoritative result not required", "time efficiency required", "location required" and "volume size not determined". In some embodiments, the pattern is stored in the form of:

[Pattern]\t[Ambiguity]\t[Authority]\t[Temporal]\t[Regional]\t[Batch]

Table 3 is an example of an intention analysis result of several queries. The results show the user search intention attributes corresponding to the queries' semantic patterns.

TABLE 3

| Query | Semantic Pattern | Degree of ambiguity | Authority requirement | Time efficiency requirement | Location requirement | Order size |
|---|---|---|---|---|---|---|
| Nokia N73 | Brand-Item name | accurate | No | No | None | retail |
| engine maintenance | Product-Intention | ambiguous | No | No | local | — |
| banana price | Product-Price | accurate | Yes | Yes | — | — |

When users select specific query results, their behaviors have the similar effects as performing certain filtering and ranking operations. Thus, at 112, filtering and ranking operations are determined based on user intention attributes. The filtering and ranking operations are ways to process retrieved results. A filtering operation selects specific results based on attributes such as location, degree of authority, ambiguity, etc. The ranking operation orders the results based on certain features such as time. For example, a result with a created time closer to the search time is ranked higher. Settings of the attributes determine which filtering method and which ranking method are to be selected. Different combinations of attribute settings correspond to different filtering methods and different ranking methods. For example, if a semantic pattern requires an authoritative result, then result information is to be filtered with a corresponding filtering method that selects an authoritative result such as a result page from an authoritative website; if a semantic pattern has a location requirement, then result information is to be filtered to meet the location requirement. Multiple filtering methods can be applied to one set of search results. In some embodiments, the filtered results are also ranked based on the degree of ambiguity; the lower the degree of ambiguity is, the higher the ranking is.

In this example, it is assumed that the correspondence relationship between a set of user search intention attributes and certain filtering and ranking methods are predefined and available during pre-processing. In some embodiments, a "correspondence relationship data table" is used to store the correspondence relationship. Example entries of correspondence relationships between the filtering and ranking methods and certain semantic patterns are shown in Table 4:

In the pre-processing process, a variety of user input queries may result in the same semantic pattern. In order to reduce the complexity of obtaining the semantic patterns, queries may be processed beforehand. In some embodiments, queries are filtered to remove redundant or meaningless symbols, stemmed to remove portions that do not add additional meaning, segmented to divide the query into individual components, etc., before their semantic patterns are determined.

In addition, on certain ecommerce platforms, since the users are typically engaged in commerce activities and their queries are often targeted towards such activities, it is possible to further improve the ability to differentiate the semantic patterns during the pre-processing process. Specifically, certain words capable of directly expressing user intentions are identified, such as "supply", "offer to buy", "purchase", and "join", which are referred to hereinafter as intention identifiers. Since a query including an intention identifier also typically includes a product, in some embodiments, such queries are automatically mapped to semantic patterns of "Intention+Product" or "Product+Intention." For example, "car purchase" is automatically mapped to a semantic pattern of "Intention+Product", and "tropical fruit supply" is automatically mapped to a semantic pattern of "Product+Intention." Once the intentional attributes associated with the query intention (e.g., degree of ambiguity, authority requirement, time efficiency requirement, location requirement, and volume size) are determined, the filtering and ranking methods of a set of intention attributes corresponding to the semantic pattern can be determined. Therefore, in subsequent search processes, if a query includes an intention identifier, its semantic pattern can be determined as "Intention+Product" or "Product+Intention". Examples of these special semantic patterns are shown in Table 5:

TABLE 4

| Semantic Pattern | User search intention attribute set of semantic pattern | Filtering method | Ranking method |
|---|---|---|---|
| Brand-Price | definite, authoritative result required, no time efficiency requirement, location required | accurate filtering (fully matching), information from authoritative websites, location-based differentiation | None |
| Location-Intention | ambiguous, authoritative result not required, time efficiency required, location required | fuzzy filtering (fuzzy matching criteria), obtaining information from various websites, location-based differentiation | ranking based on the order of time |
| . . . | . . . | . . . | . . . |

TABLE 5

| Query | Semantic Pattern | PV |
| --- | --- | --- |
| purchase camera | Intention + Product | 13 |
| ... | ... | ... |
| engine maintenance | Product + Intent | 11 |

It should be noted that, determining intention identifiers without considering the context of the query may result in poor coverage since not all semantic patterns related to an intention identifier can be found and determined. To solve this issue, before statistical measurements are made based on the PV of the queries, the query may be extended such that individual words and corresponding semantic patterns are included in the PV count. For example, the query "chemical product transport" may be extended to "product transport", "product intention identifier", and "chemical product intention identifier".

As the amount of the extended query and its patterns can be large, merging may be performed using a distributed computing platform according to the patterns, and ranking may be performed on results according to the PVs. The results may be formatted as:

[Pattern]\t[PV]\t[Unique Count]\t[Examples]

In some embodiments, pattern screening is performed on the semantic patterns determined in the pre-processing process to determine a proper pattern. A proper pattern should have uniform coverage of a number of queries. In some embodiments, the evaluation is performed as follows: setting a threshold for the number of PVs covered by a semantic pattern, setting a threshold for the entropy of PV distribution of queries covered by the semantic pattern, computing the entropy of the semantic patterns based on the queries, and filtering determined semantic patterns based on the PV threshold and the threshold entropy to remove from the results semantic patterns that have poor coverage or have poor uniformity in distribution. In some embodiments, the entropy of PV distribution of queries covered by a semantic pattern is computed as follows:

Entropy=$-\Sigma_{i=0}^{N-1} P_i * \log(P_i)$, where i corresponds to the index of the query and $P_i$ corresponds to the probability of the query appearing in all the queries that correspond to the semantic pattern.

For example, if a particular semantic pattern has 2 corresponding queries, and each query appears 10 times in the historical samples, the entropy of the semantic pattern is:

$-0.5 * \log 0.5 - 0.5 \log 0.5 = \log 2$.

As another example, if the semantic pattern has 2 corresponding queries, one appears 5 times in the historical samples and another appears 10 times, the entropy of the semantic pattern is:

$-\frac{1}{3} * \log(\frac{1}{3}) - \frac{2}{3} * \log(\frac{2}{3})$.

A high entropy value indicates good coverage by the semantic pattern. A low entropy value, such as a value that does not meet the predefined threshold, indicates poor coverage by the semantic pattern and is therefore removed from the results.

Subsequently, an intention analysis is performed, and a correspondence relationship between a semantic pattern and a classified target is set.

Furthermore, upon setting of intention identifiers to improve the differentiating ability of semantic patterns, a query may have a plurality of semantic patterns. Semantic patterns having a specific meaning are of a greater priority and semantic patterns having an abstract meaning are of a lower priority. For example, the query "Banana Price" may correspond to two patterns "Product+Intention" and "Product+Price." Since the second pattern has more specific meaning than the first pattern, "Product+Price" is to be selected as the semantic pattern that corresponds to "Banana Price".

Figure 2:
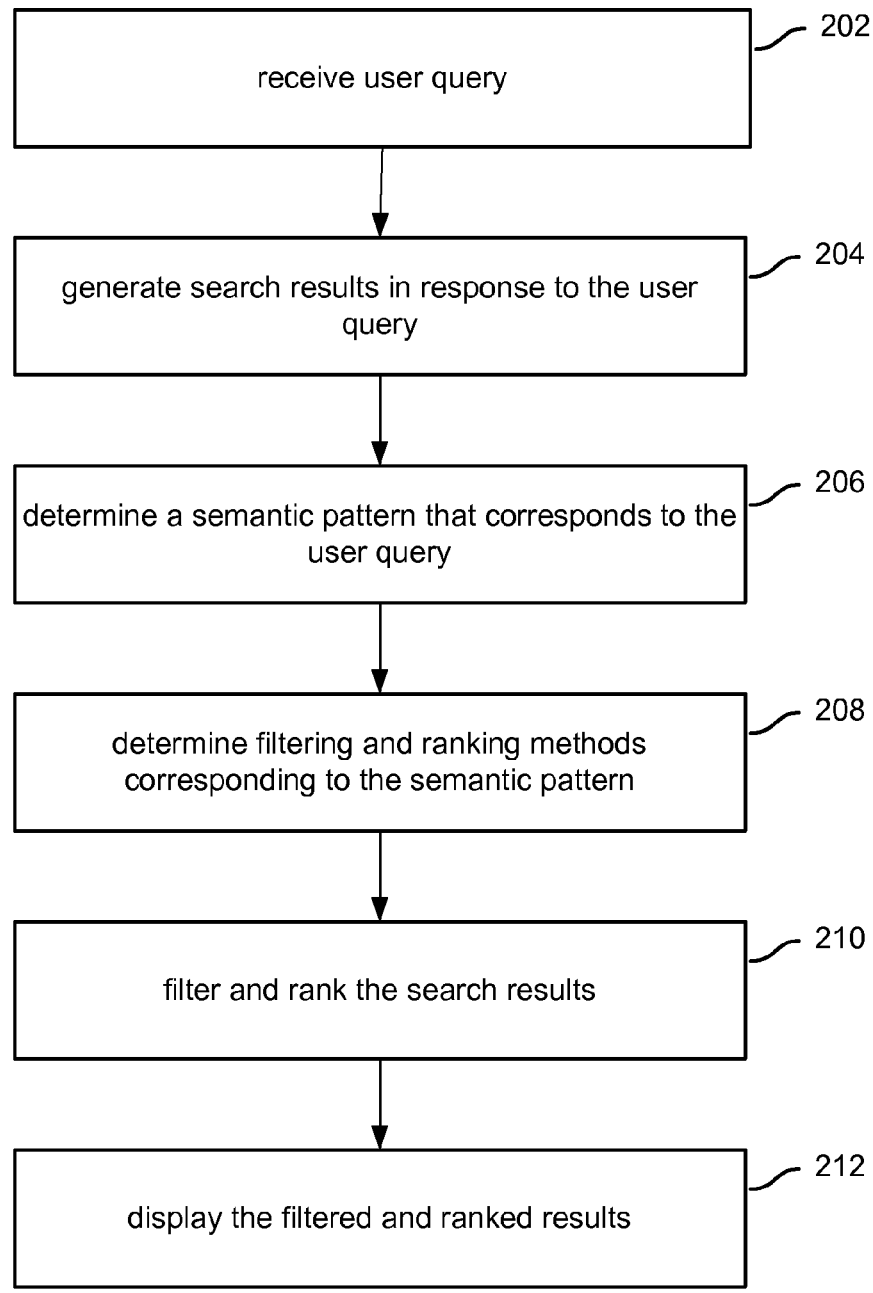
FIG. 2 is a flowchart illustrating an embodiment of a process for processing a query.

The above pre-processing process sets up the correspondence relationships between semantic patterns and filtering and ranking methods. When processing a query received, based on its semantic pattern and the correspondence relationship, the query results returned by the search engine are filtered and ranked to display a list of results that matches the user's intentions well. FIG. 2 is a flowchart illustrating an embodiment of a process for processing a query.

At 202, a user query is received. At 204, search results are generated in response to the query. In some embodiments, the search results are generated by a standard search engine.

At 206, a semantic analysis is performed on the query to determine its semantic pattern. In some embodiments, a matching semantic tag is found using a preconfigured query term/semantic tag database, and a matching semantic pattern is found using a query/semantic pattern table such as Table 1 shown in the example above. Thus, the query "digital camera" or "mobile battery" correspond to the semantic pattern "Modifier+Product".

At 208, filtering and ranking methods corresponding to the semantic pattern of the query are determined based on pre-configured reference information such as a correspondence relationship data table (Table 4) shown above. Given the semantic pattern of the query, the filtering and ranking methods are looked up in the table.

At 210, search results returned by the search engine are filtered using the filtering method, and the results selected by the filtering methods are ranked according to the ranking method.

At 212, the filtered and ranked results are displayed.

Particularly, searching is performed with the query, retrieved results are filtered using the filtering method, and finally ranked and displayed according to the ranking method.

For example, for the query "Mobile Battery", which has the semantic pattern "Modifier-Product," the corresponding filtering method is to screen results using the modifier "Mobile" as a modifying condition and to enter the product "Battery" into the search engine as a search subject.

Figure 3:
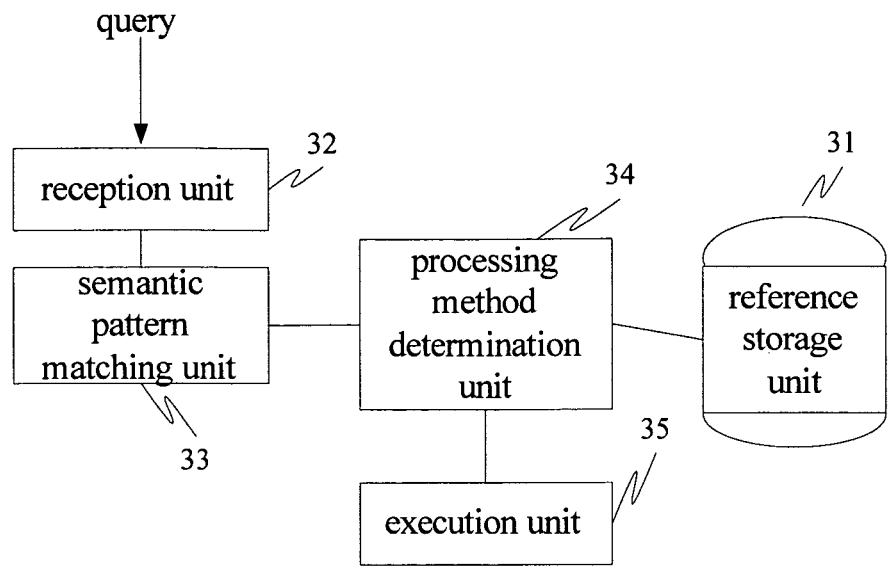
FIG. 3 is a block diagram of an embodiment of an information processing system that implements the pre-processing operations discussed above.

FIG. 3 is a block diagram of an embodiment of an information processing system that implements the pre-processing operations discussed above. System 300 may be implemented using one or more computing devices such as a personal computer, a server computer, a handheld or portable device, a flat panel device, a multi-processor system, a microprocessor based system, a minicomputer, a large-scale computer, a special purpose device, a distributed computing environment including any of the foregoing systems or devices, or other hardware/software/firmware combination that includes one or more processors, and memory coupled to the processors and configured to provide the processors with instructions.

In this example, system 300 includes a reference storage unit 31, a reception unit 32, a semantic pattern matching unit 33, a processing method determination unit 34, and an execution unit 35.

The reference storage unit 31 is adapted to store a correspondence relationship between a semantic pattern and filtering and ranking methods, the semantic pattern being a semantic pattern that appears with a rate that at least meets a predetermined threshold. Semantic patterns are summarized based on characteristics of natural languages.

In some embodiments, the reference storage unit also stores a search log of user behaviors corresponding to the queries for statistical measurement of semantic patterns of queries, as well as the user's search intention attributes representing the user's behaviors. The setting of the user's search intention attribute determines a filtering method and a ranking method. Therefore, a correspondence relationship between a semantic pattern and filtering and ranking methods can be established.

The reception unit 32 is adapted to receive a query entered by a user. The query normally includes a plurality of keywords.

The semantic pattern matching unit 33 is adapted to perform a semantic analysis on the query received by the reception unit 32 to determine a semantic tag of the query and then determine a semantic pattern of the query based on the semantic tag.

The processing method determination unit 34 is adapted to determine a filtering method and a ranking method corresponding to the semantic pattern of the query, according to reference information stored in storage unit 31.

The execution unit 35 is adapted to process retrieved results using the filtering method and the ranking method. In some embodiments, the execution unit also performs pattern screening as discussed above.

Figure 4:
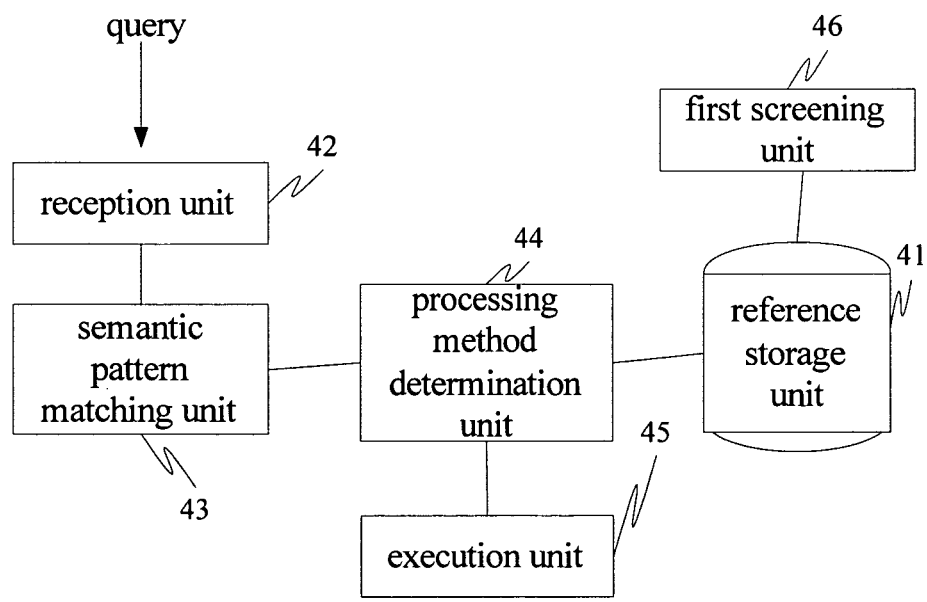
FIG. 4 is a block diagram of an embodiment of an information processing system that implements the query processing operations discussed above.

FIG. 4 is a block diagram of an embodiment of an information processing system that implements the query processing operations discussed above. System 400 may be implemented using one or more computing devices such as a personal computer, a server computer, a handheld or portable device, a flat panel device, a multi-processor system, a microprocessor based system, a minicomputer, a large-scale computer, a special purpose device, a distributed computing environment including any of the foregoing systems or devices, or other hardware/software/firmware combination that includes one or more processors, and memory coupled to the processors and configured to provide the processors with instructions.

In this example, system 400 includes a reference storage unit 41, a reception unit 42, a semantic pattern matching unit 43, a processing method determination unit 44, an execution unit 45, and a first screening unit 46.

The reception unit 42, the semantic pattern matching unit 43, the processing method determination unit 44, and the execution unit 45 function substantially the same as the reception unit 32, the semantic pattern matching unit 33, the processing method determination unit 34 and the execution unit 35.

The first screening unit 46 is adapted to compute the number of queries matching a semantic pattern in a predetermined period of time, determine coverage of the semantic pattern as the ratio of the number of the queries to the number of total queries, and obtain a semantic pattern with the coverage higher than a predetermined threshold.

The reference storage unit 41 is adapted to store a correspondence relationship between a semantic pattern and filtering and ranking methods, the semantic pattern being a semantic pattern with a rate of appearance higher than a predetermined threshold and with the coverage higher than a predetermined threshold among semantic patterns of queries in the history record.

Figure 5:
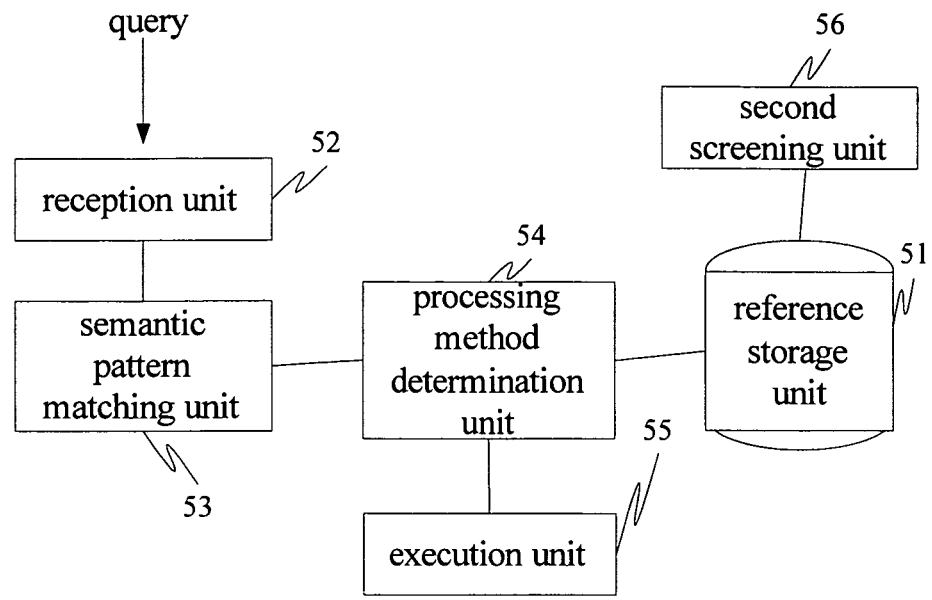
FIG. 5 is a block diagram illustrating another embodiment of an information retrieval system.

FIG. 5 is a block diagram illustrating another embodiment of an information retrieval system. System 500 includes a reference storage unit 51, a reception unit 52, a semantic pattern matching unit 53, a processing method determination unit 54, an execution unit 55, and a second screening unit 56.

The reception unit 52, the semantic pattern matching unit 53, the processing method determination unit 54, and the execution unit 55 function substantially the same as the reception unit 32, the semantic pattern matching unit 33, the processing method determination unit 34, and the execution unit 35.

The second screening unit 56 is adapted to compute entropy of keywords with the same semantic pattern against all queried keywords, determine the entropy as a differentiating ability of the semantic pattern, and obtain a semantic pattern with the entropy higher than a predetermined value.

The reference storage unit 51 is adapted to store a corresponded relationship between a semantic pattern and filtering and ranking methods, the semantic pattern being a semantic pattern with a rate of appearance higher than a predetermined threshold and with the entropy higher than a predetermined threshold among semantic patterns of queries in the history record.

Figure 6:
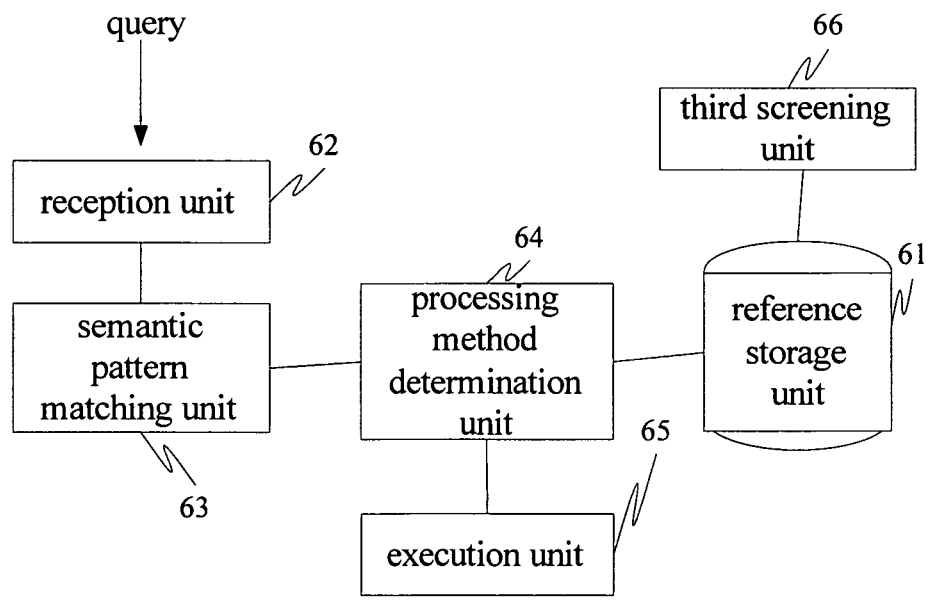
FIG. 6 is a block diagram illustrating another embodiment of an information retrieval system.

FIG. 6 is a block diagram illustrating another embodiment of an information retrieval system. System 600 includes a reference storage unit 61, a reception unit 62, a semantic pattern matching unit 63, a processing method determination unit 64, an execution unit 65, and a third screening unit 66.

The reception unit 62, the semantic pattern matching unit 63, the processing method determination unit 64, and the execution unit 65 function substantially the same as the reception unit 32, the semantic pattern matching unit 33, the processing method determination unit 34, and the execution unit 35.

The third screening unit 66 is adapted to compute the number of queries matching a semantic pattern in a predetermined period of time, determine coverage of the semantic pattern as the ratio of the number of the queries to the number of total queries, compute entropy of keywords with the same semantic pattern against all queried keywords in the predetermined period of time, and obtain a semantic pattern with a rate of appearance higher than a predetermined threshold, with the coverage higher than a predetermined threshold and with the entropy higher than a predetermined value.

The reference storage unit 61 is adapted to store a corresponded relationship between a semantic pattern and filtering and ranking methods, the semantic pattern being a semantic pattern with a rate of appearance higher than a predetermined threshold, with the entropy higher than a predetermined threshold and with the coverage higher than a predetermined threshold among semantic patterns of queries in history records.

Systems 300, 400, 500, and 600 may be implemented using one or more computing devices such as a personal computer, a server computer, a handheld or portable device, a flat panel device, a multi-processor system, a microprocessor based system, a minicomputer, a large-scale computer, a special purpose device, a distributed computing environment including any of the foregoing systems or devices, or other hardware/software/firmware combination that includes one or more processors, and memory coupled to the processors and configured to provide the processors with instructions. The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipments, etc.) implement the methods described in the embodiments of the present invention. The units may be implemented on a single device or distributed across multiple devices. The functions of the units may be merged into one another or further split into multiple sub-units.

Steps of the method or algorithm of the embodiments described herein may be implemented with hardware, software modules executed by a processor, or a combination of them. The software modules may be placed in Random-access memory (RAM), memory, Read-only memory (ROM), electrically programmable ROM, electrically erasable programmable ROM, registers, hard disks, removable hard disk, CD-ROM, or any other form of storage medium known in the art.

Information retrieval involving pre-processing operations and query processing has been disclosed. The pre-processing operations set semantic patterns based on characteristics of natural languages and user habits, and establish a correspondence relationship between the semantic patterns and filtering and ranking methods. Upon receiving a query entered by a user, a semantic pattern matching the query is determined, and possible search results are filtered and ranked using the corresponding filtering and ranking methods. Because user intentions based on historical data are accounted for in the analysis and presentation of search results, the relevance between user intentions and retrieved results are improved, and search accuracy is increased.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An information retrieval method, comprising:
   pre-processing a set of historical query information, comprising:
   determining a plurality of semantic patterns based on a plurality of queries in the set of historical query information, wherein the determining of the plurality of semantic patterns comprises:
   determining whether a number of times a sematic pattern appears in the set of historical query information exceeds a predetermined threshold; and
   in the event that the number of times the sematic pattern appears in the set of historical query information exceeds the predetermined threshold, selecting the semantic pattern;
   establishing correspondence relationships between the plurality of semantic patterns and a plurality of filtering and ranking operations, wherein establishing correspondence relationships comprises:
   determining user behaviors corresponding to the plurality of semantic patterns based on the set of historical query information;
   determining a plurality of user intention attributes of the plurality of semantic patterns based on the user behaviors, wherein the plurality of user intention attributes include a degree of ambiguity attribute, an authority requirement attribute, a time efficiency requirement attribute, a location requirement attribute, a volume attribute, or any combination thereof;
   determining the plurality of filtering and ranking operations based on the plurality of user intention attributes; and
   storing correspondence relationships between the plurality of filtering and ranking operations and semantic patterns based on the user behavior sets and user intention attributes; and
   processing a user query made by a user, comprising:
   receiving the user query;
   retrieve a plurality of results in response to the user query;
   determining a semantic pattern that corresponds to the user query;
   determining a set of filtering and ranking operations that corresponds to the semantic pattern based on the correspondence relationships that are established during the pre-processing; and
   performing the set of filtering and ranking operations on the plurality of results to generate a set of filtered and ranked results.

2. The method of claim 1, wherein determining the plurality of semantic patterns based on the plurality of queries in the historical query information includes:
   identifying a plurality of semantic tag sets for the plurality of queries, each semantic tag set comprising a plurality of semantic tags that characterizes a plurality of query terms in a corresponding query;
   determining possible semantic patterns that correspond to the plurality of queries in the set of historical records based on the plurality of semantic tag sets.

3. The method of claim 2, further comprising:
   computing entropy of the semantic pattern; and
   discarding the semantic pattern if its entropy does not meet a predetermined threshold value.

4. The method of claim 1, wherein the plurality of user intention attributes include a degree of ambiguity attribute.

5. The method of claim 1, wherein the plurality of user intention attributes include an authority requirement attribute.

6. The method of claim 1, wherein the plurality of user intention attributes include a time efficiency requirement attribute.

7. The method of claim 1, wherein the plurality of user intention attributes include a location requirement attribute.

8. The method of claim 1, wherein the plurality of user intention attributes include a volume attribute.

9. An information retrieval system, comprising:
   one or more processors configured to:
   pre-process a set of historical query information, comprising:
   determining a plurality of semantic patterns based on a plurality of queries in the set of historical query information, wherein the determining of the plurality of semantic patterns comprises:
   determining whether a number of times a sematic pattern appears in the set of historical query information exceeds a predetermined threshold; and
   in the event that a number of times a sematic pattern appears in the set of historical query information exceeds the predetermined threshold, selecting the semantic pattern;
   establishing correspondence relationships between the plurality of semantic patterns and a plurality of filtering and ranking operations, wherein establishing correspondence relationships comprises:
   determining user behaviors corresponding to the plurality of semantic patterns based on the set of historical query information;
   determining a plurality of user intention attributes of the plurality of semantic patterns based on the user behaviors, wherein the plurality of user intention attributes include a degree of ambiguity attribute, an authority requirement attribute, a time efficiency requirement attribute, a location requirement attribute, a volume attribute, or any combination thereof;

determining the plurality of filtering and ranking operations based on the plurality of user intention attributes; and storing correspondence relationships between the plurality of filtering and ranking operations and semantic patterns based on the user behavior sets and user intention attributes; and process a user query made by a user, comprising:
receiving the user query;
retrieving a plurality of results in response to the user query;
determining a semantic pattern that corresponds to the user query;
determining a set of filtering and ranking operations that corresponds to the semantic pattern based on the correspondence relationships that are established during the pre-processing; and
performing the set of filtering and ranking operations on the plurality of results to generate a set of filtered and ranked results; and one or more memories coupled to the processors, configured to provide the processors with instructions.

10. The system of claim 9, wherein determining the plurality of semantic patterns based on the plurality of queries in the historical query information includes:
identifying a plurality of semantic tag sets for the plurality of queries, each semantic tag set comprising a plurality of semantic tags that characterizes a plurality of query terms in a corresponding query;
determining possible semantic patterns that correspond to the plurality of queries in the set of historical records based on the plurality of semantic tag sets.

11. The system of claim 10, further comprising:
computing entropy of the semantic pattern; and
discarding the semantic pattern if its entropy does not meet a predetermined threshold value.

12. The system of claim 9, wherein the plurality of user intention attributes include a degree of ambiguity attribute.

13. The system of claim 9, wherein the plurality of user intention attributes include an authority requirement attribute.

14. The system of claim 9, wherein the plurality of user intention attributes include a time efficiency requirement attribute.

15. The system of claim 9, wherein the plurality of user intention attributes include a location requirement attribute.

16. The system of claim 9, wherein the plurality of user intention attributes include a volume attribute.

17. A computer program product for inferring a characteristic of an individual, the computer program product being embodied in a tangible non-transitory computer readable storage medium and comprising computer instructions for:
pre-processing a set of historical query information, comprising:
determining a plurality of semantic patterns based on a plurality of queries in the set of historical query information, wherein the determining of the plurality of semantic patterns comprises:
determining whether a number of times a sematic pattern appears in the set of historical query information exceeds a predetermined threshold; and
in the event that the number of times the semantic pattern appears in the set of historical query information exceeds the predetermined threshold, selecting the semantic pattern;
establishing correspondence relationships between the plurality of semantic patterns and a plurality of filtering and ranking operations, wherein establishing correspondence relationships comprises:
determining user behaviors corresponding to the plurality of semantic patterns based on the set of historical query information;
determining a plurality of user intention attributes of the plurality of semantic patterns based on the user behaviors, wherein the plurality of user intention attributes include a degree of ambiguity attribute, an authority requirement attribute, a time efficiency requirement attribute, a location requirement attribute, a volume attribute, or any combination thereof;
determining the plurality of filtering and ranking operations based on the plurality of user intention attributes; and
storing correspondence relationships between the plurality of filtering and ranking operations and semantic patterns based on the user behavior sets and user intention attributes; and
processing a user query made by a user, comprising:
receiving the user query;
retrieving a plurality of results in response to the user query;
determining a semantic pattern that corresponds to the user query;
determining a set of filtering and ranking operations that corresponds to the semantic pattern based on the correspondence relationships that are established during the pre-processing; and
performing the set of filtering and ranking operations on the plurality of results to generate a set of filtered and ranked results.

18. The method of claim 1, wherein the determining of the plurality of filtering operations comprises selecting specific results based on the plurality of user intention attributes.

* * * * *